(12) United States Patent
Liu

(10) Patent No.: US 11,996,775 B2
(45) Date of Patent: May 28, 2024

(54) DC TRANSFORMER CIRCUIT

(71) Applicant: TCL CHINA STAR OPTOELECTRONICS TECHNOLOGY CO., LTD., Shenzhen (CN)

(72) Inventor: Jinfeng Liu, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 302 days.

(21) Appl. No.: 17/440,145

(22) PCT Filed: Dec. 29, 2020

(86) PCT No.: PCT/CN2020/140686
§ 371 (c)(1),
(2) Date: Sep. 16, 2021

(87) PCT Pub. No.: WO2022/121023
PCT Pub. Date: Jun. 16, 2022

(65) Prior Publication Data
US 2023/0093242 A1    Mar. 23, 2023

(30) Foreign Application Priority Data
Dec. 11, 2020 (CN) .......................... 202011463603.7

(51) Int. Cl.
*H02M 3/158* (2006.01)
*G09G 5/00* (2006.01)
*H02M 3/06* (2006.01)
*H02M 3/157* (2006.01)

(52) U.S. Cl.
CPC .......... *H02M 3/1582* (2013.01); *G09G 5/003* (2013.01); *H02M 3/06* (2013.01); *H02M 3/157* (2013.01); *G09G 2330/028* (2013.01)

(58) Field of Classification Search
CPC ...... H02M 3/06; H02M 3/157; H02M 3/1582; G09G 5/003; G09G 2330/028
USPC ........................................................ 323/259
See application file for complete search history.

(56) References Cited

U.S. PATENT DOCUMENTS

| | | | |
|---|---|---|---|
| 7,411,354 B2* | 8/2008 | Hsu ..................... | H05B 41/2855 315/276 |
| 2016/0172980 A1* | 6/2016 | Byun .................... | H02M 3/156 323/284 |
| 2017/0006688 A1* | 1/2017 | Dai ....................... | G09G 3/2003 |

FOREIGN PATENT DOCUMENTS

| | | |
|---|---|---|
| CN | 207069900 U | 3/2018 |
| CN | 108063544 A | 5/2018 |
| CN | 209299141 U | 8/2019 |

* cited by examiner

*Primary Examiner* — Yemane Mehari
(74) *Attorney, Agent, or Firm* — PV IP PC; Wei Te Chung; Zhigang Ma (57) ABSTRACT

A DC transformer circuit is provided. A first end of an energy storage inductor in the DC transformer circuit is connected with a module output pin in a DC transformer module, and a second end of the energy storage inductor is connected to a grounded terminal. Using the DC transformer circuit can thus generate a negative voltage for a display device. Compared to a DC buck-boost circuit adopted in the existing arts, the DC transformer circuit has an advantage of low cost.

20 Claims, 5 Drawing Sheets

DC TRANSFORMER CIRCUIT

RELATED APPLICATIONS

This application is a Notional Phase of PCT Patent Application No. PCT/CN2020/140686 having international filing date of Dec. 29, 2020, which claims the benefit of priority of Chinese Patent Application No. 202011463603.7 filed on Dec. 11, 2020. The contents of the above applications are all incorporated by reference as if fully set forth herein in their entirety.

FIELD OF THE DISCLOSURE

The present invention relates to display technologies, and more particularly to a DC transformer circuit for driving a display panel.

DESCRIPTION OF RELATED ARTS

Figure 1:
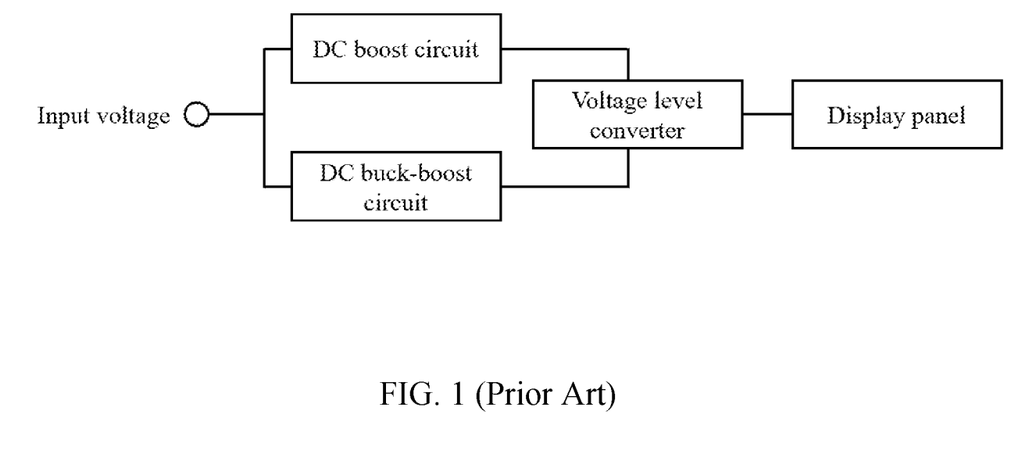
FIG. 1 is a schematic block diagram showing a driving circuit for driving a display panel of a display device in the existing arts.

FIG. 1 is a schematic block diagram showing a driving circuit for driving a display device in the existing arts. The display device includes a DC boost circuit, a DC bulk-boost circuit, a voltage level converter and a display panel. One end of the DC boost circuit and the DC bulk-boost circuit are fed with an input voltage and the other end of the DC boost circuit and the DC bulk-boost circuit is connected to one end of the voltage level converter. The other end of the voltage level converter is connected to the display panel. Based on the input voltage, the DC boost circuit generates a positive voltage that is provided to the display device for switching on a thin-film transistor, for example. Based on the input voltage, the bulk-boost circuit generates a negative voltage that is provided to the display device for switching off a thin-film transistor, for example (for example, the DC boost circuit generate a positive voltage of 28 Volts based on an input voltage of 12 Volts and the DC bulk-boost circuit generates a negative voltage of −10 Volts based on an input voltage of 12 Volts). Also, after passing through the voltage level converter, the positive voltage and the negative voltage will be converted into a voltage for driving the display panel.

Based on above descriptions, the DC bulk-boost circuit is used in the existing arts to generate the negative voltage. However, since the manufacture cost of the DC bulk-boost circuit is high and types of the DC bulk-boost circuit on the market is less in number as compared to types of a DC buck circuit. It is not beneficial for development of the display device. Also, the manufacture cost of the display device increases.

Therefore, it needs to provide a DC transformer circuit for generating the negative voltage needed by the display device.

SUMMARY

Technical Problems

An objective of the present invention is to provide a DC transformer circuit for solving the problems in the existing arts.

Technical Solutions

To achieve above objective, a first aspect of the present invention provides a direct-current (DC) transformer circuit of a display device, the display device including a display panel, the DC transformer circuit configured to provide a voltage for driving the display panel, characterized in that the DC transformer circuit includes:

a DC transformer module, including an input pin, an enabling pin, a ground pin and a module output pin, wherein the input pin is fed with an input voltage, the enabling pin is fed with an enabling voltage, the ground pin is conductive with an output voltage, the module output pin outputs a module output voltage;

an energy storing inductor, a first end of the energy storing inductor connected to the module output pin and a second end of the energy storing inductor connected to a grounded terminal, configured to be fed with the module output voltage outputted by the module output pin when the enabling pin is fed with a high-level enabling voltage; and a resistor circuit, the first end of the resistor circuit connected to the second end of the energy storing inductor and the second end of the resistor circuit connected to the ground pin, configured to cooperate with the energy storing inductor to transform the module output voltage into the output voltage, wherein a value of the output voltage is lower than a voltage value of the grounded terminal, and the output voltage is a negative voltage.

Further, the DC transformer module further includes a module output portion, the module output portion drives the outputting of the module output voltage based on the enabling voltage fed by the enabling pin, the module output portion outputs the module output voltage via the module output pin when the enabling pin is fed with the high-level enabling voltage, and the module output portion will not output the module output voltage when the enabling pin is fed with a low-level enabling voltage.

Further, a voltage difference between the input voltage and the output voltage does not exceed 30 Volts.

Further, the module output voltage is a pulse voltage, and a duty ratio of the pulse voltage is controlled by pulse-width modulation (PWM).

Further, the DC transformer circuit further includes a voltage, and decoupling circuit for storing energy to remove signal interference, the decoupling circuit including:

a first decoupling capacitor, the first end of the first decoupling capacitor fed with the input voltage and connected to the input pin and the second end of the first decoupling capacitor is grounded; and a second decoupling capacitor, the first end of the second decoupling capacitor fed with the input voltage and connected to the first end of the first decoupling capacitor and the input pin and the second end of the second decoupling capacitor connected to the ground pin and being conductive with the output voltage.

Further, the DC transformer circuit further includes a first enabling circuit, wherein the first enabling circuit receives the input voltage and outputs the enabling voltage, and the first enabling circuit includes:

a first voltage dividing resistor, the first end of the first voltage dividing resistor fed with the input voltage and connected to the input pin and the second end of the first voltage dividing resistor connected to the enabling pin; and a second voltage dividing resistor, the first end of the second voltage dividing resistor connected to the second end of the first voltage dividing resistor and the enabling pin and the second end of the second voltage dividing resistor connected to the ground pin and being conductive with the output voltage.

Further, the DC transformer circuit further includes a second enabling circuit, wherein the second enabling circuit receives the input voltage and the output voltage and outputs the enabling voltage, and the second enabling circuit includes:
  a comparator, a positive end of the comparator fed with a reference voltage and a negative end of the comparator fed with a comparison voltage, configured to output the enabling voltage after comparing values of the reference voltage and the comparison voltage,
  wherein the comparison voltage is a difference between the input voltage and the output voltage.

Further, the comparator outputs the high-level enabling voltage when the comparison voltage is greater than the reference voltage and the comparator outputs a low-level enabling voltage when the comparison voltage is less than the reference voltage.

Further, the second enabling circuit further includes a plurality of operational amplifiers, and the comparison voltage is obtained by calculations made by the plurality of operational amplifiers.

Further, the plurality of operational amplifiers include:
  a first operational amplifier, in which the positive end of the first operational amplifier is connected to one end of a first operational resistor, the other end of the first operational resistor is grounded, the negative end of the first operational amplifier is connected to one end of a second operational resistor and a third operational resistor, the other end of the second operational resistor is fed with the input voltage, and the other end of the third operational resistor is connected to an output end of the first operational amplifier; and
  a second operational amplifier, in which the positive end of the second operational amplifier is connected to one end of a fourth operational resistor, the other end of the fourth operational resistor is grounded, the negative end of the second operational amplifier is connected to one end of a fifth operational resistor, a sixth operational resistor and a seventh operational resistor, the other end of the fifth operational resistor is fed with the output voltage, the other end of the sixth operational resistor is connected to the other end of the third operational resistor and the output end of the first operational amplifier, the other end of the seventh operational resistor is connected to the output end of the second operational amplifier, and the voltage of the output end of the second operational amplifier is the comparison voltage,
  wherein the first operational resistor, the second operational resistor and the third operational resistor have a same resistance value, and the fourth operational resistor, the fifth operational resistor, the sixth operational resistor and the seventh operational resistor have a same resistance value.

Further, a first current flowing through the second operational resistor satisfies $I1=V_{IN}/Ra2$, the first current I1 is equal to a second current flowing through the third operational resistor, and a computational voltage of the output end of the first operational amplifier satisfies $V_c=-(I2 \times Ra3)=-V_{IN}$, wherein I1 is the first current, I2 is the second current, $V_c$ is the computational voltage, $V_{IN}$ is the input voltage, Ra2 is the second operational resistor, and Ra3 is the third operational resistor.

Further, a third current flowing through the fifth operational resistor satisfies $I3=V_{out}/Ra5$, a fourth current flowing through the seventh operational resistor is equal to a sum of the second current and the third current, and meanwhile the comparison voltage satisfies $V_{comp}=V_{IN}-V_{out}$, wherein I3 is the third current, $V_{out}$ is the output voltage, Ra5 is the fifth operational resistor, and $V_{comp}$ is the comparison voltage.

Further, the DC transformer circuit further includes a first enabling circuit, a second enabling circuit and a logic operational portion, wherein the first enabling circuit is connected to the logic operational portion, the second enabling circuit is connected to the logic operational portion, the logic operational portion is connected to the enabling pin, the first enabling circuit receives the input voltage and outputs a first sub enabling voltage, the second enabling circuit receives the input voltage and the output voltage and outputs a second sub enabling voltage, the logic operational portion outputs the enabling voltage based on voltage levels of the first sub enabling voltage and the second sub enabling voltage, the logic operational portion outputs the high-level enabling voltage when both the first sub enabling voltage and the second sub enabling voltage are at high voltage level, and the logic operational portion outputs a low-level enabling voltage when at least one of the first sub enabling voltage and the second sub enabling voltage is at low voltage level.

Further, the DC transformer module further includes a feedback pin, the resistor circuit is further configured to divide the output voltage into a feedback voltage, the feedback pin is used to be fed with the feedback voltage, the module output pin is used to control a period of the output of the module output voltage based on the feedback voltage, and the resistor circuit includes:
  a third voltage dividing resistor, the first end of the third voltage dividing resistor being conductive with the second end of the energy storing inductor and the grounded terminal and the second end of the third voltage dividing resistor being conductive with the feedback pin; and
  a fourth voltage dividing resistor, the first end of the fourth voltage dividing resistor being conductive with the second end of the third voltage dividing resistor and the feedback pin and the second end of the fourth voltage dividing resistor being conductive with the ground pin and the output voltage.

Further, the fourth voltage dividing resistor satisfies $R4=V_{FB} \times R3(|V_{out}|-V_{FB})$ wherein R3 is the third voltage dividing resistor, R4 is the fourth voltage dividing resistor, $V_{FB}$ is the feedback voltage, and $V_{out}$ is the output voltage.

Further, the DC transformer circuit further includes a bootstrap circuit, wherein the DC transformer module further includes a bootstrap pin, one end of the bootstrap circuit is conductive with the bootstrap pin, another end of the bootstrap circuit is connected to the module output pin and the first end of the energy storing inductor, the bootstrap circuit is configured to keep a switch of the DC transformer module at a switched-on state, and the bootstrap circuit includes a bootstrap capacitor.

Further, the bootstrap circuit further includes a bootstrap resistor, and the bootstrap resistor is connected in series with the bootstrap capacitor and is configured to lower a peak voltage of the module output voltage.

Further, the DC transformer circuit further includes:
  a filter capacitor, the first end of the filter capacitor connected to the second end of the energy storing inductor, the first end of the resistor circuit and the grounded terminal and the second end of the filter capacitor being conductive with the output voltage and connected to the second end of the resistor circuit and the ground pin, configured to store energy for removing signal interference.

Further, the DC transformer circuit further includes:
a diode, the first end of the diode connected to the second end of the energy storing inductor, the first end of the resistor circuit and the grounded terminal and the second end of the diode being conductive with the output voltage and connected to the second end of the resistor circuit and the ground pin, configured to stabilize a voltage difference between the voltage of the grounded terminal and the output voltage.

Further, the diode is a Zener diode.

Beneficial Effects

In the present invention, the first end of the energy storage inductor is connected with the module output pin, and the second end of the energy storage inductor is connected to the grounded terminal. Using the DC transformer circuit can thus generate the negative voltage for the display device. Compared to the DC buck-boost circuit adopted in the existing arts, the DC transformer circuit has an advantage of low cost. In addition, in an embodiment of the present invention, the DC transformer circuit includes an enabling circuit (i.e., the second enabling circuit), which determines whether to output the enabling voltage based on the values of the input voltage and the output voltage so as to control whether the DC transformer module works, thereby preventing the DC transformer circuit from malfunction, caused when the voltage difference between the input voltage and the output voltage is too large.

DESCRIPTION OF EMBODIMENTS OF THE DISCLOSURE

To make the objectives, technical schemes, and effects of the present invention more clear and specific, the present invention is described in further detail below with reference to the appending drawings. It should be understood that the specific embodiments described herein are merely for interpreting the present invention and the present invention is not limited thereto.

Figure 2:
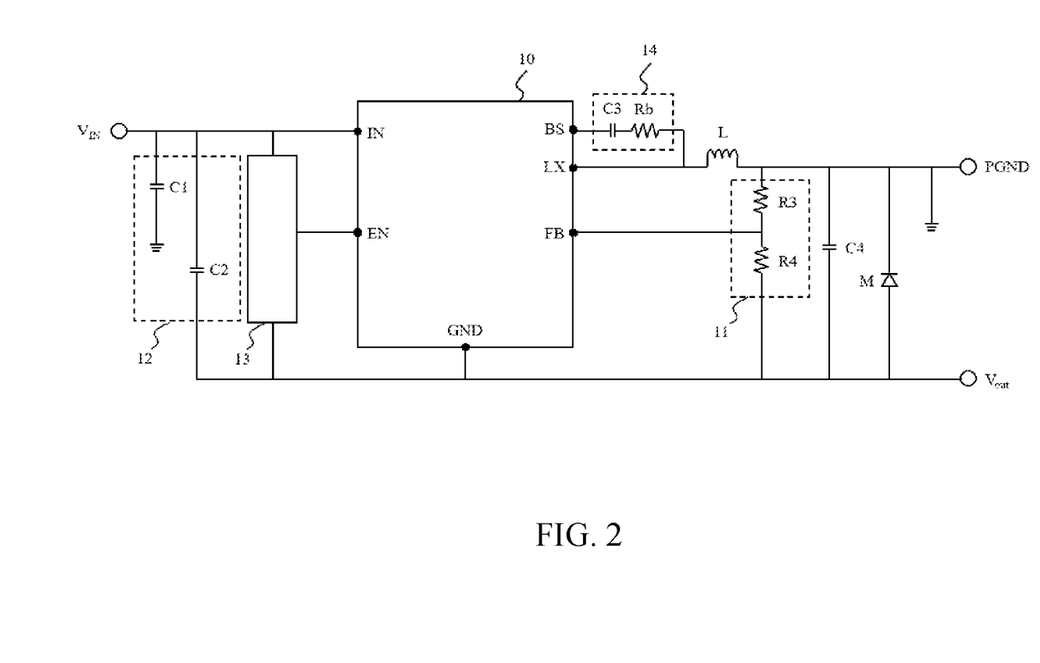
FIG. 2 is a schematic diagram showing a DC transformer circuit of a display device according to an embodiment of the present application.

FIG. 2 is a schematic diagram showing a DC transformer circuit of a display device according to an embodiment of the present application.

In the present embodiment, the display device includes a display panel (not shown). The DC transformer circuit is configured to provide a voltage for driving the display panel. The DC transformer circuit includes a DC transformer module 10, an energy storing inductor L and a resistor circuit 11. The DC transformer module 10 includes an input pin IN, an enabling pin EN, a ground pin GND and a module output pin LX for executing a voltage transformation function. The input pin IN is fed with an input voltage $V_{IN}$ for driving the DC transformer module 11; the enabling pin EN is fed with an enabling voltage $V_{EN}$, the ground pin GND is conductive with an output voltage $V_{out}$; the module output pin LX outputs a module output voltage $V_{LX}$; the first end of the energy storing inductor L is connected to the module output pin LX and the second end of the energy storing inductor L is connected to a grounded terminal PGND; the first end of the resistor circuit 11 is connected to the second end of the energy storing inductor L and the second end of the resistor circuit 11 is connected to the ground pin GND.

In the present embodiment, the DC transformer module 10 further includes a module output portion (not shown), and the module output portion drives the outputting of the module output voltage $V_{LX}$ based on the enabling voltage $V_{EN}$ fed by the enabling pin EN. The module output portion outputs the module output voltage $V_{LX}$ via the module output pin LX when the enabling pin EN is fed with a high-level enabling voltage $V_{EN}$, and meanwhile the energy storing inductor L is able to be fed with the module output voltage $V_{LX}$ outputted by the module output pin LX. The module output portion will not output the module output voltage $V_{LX}$ when the enabling pin EN is fed with a low-level enabling voltage $V_{EN}$.

In the present embodiment, the module output voltage $V_{LX}$ can be a pulse voltage, and a duty ratio of the pulse voltage may be controlled by pulse-width modulation (PWM). The second end of the energy storing inductor L is connected to the grounded terminal PGND and the value of the module output voltage $V_{LX}$ is greater than the voltage value of the ground pin GND. As a result, after a current outputted by the module output pin LX flows through the energy storing inductor L, the current will pass through the resistor circuit 11 and then the voltage (with a value of 0) of the grounded terminal PGND decreases so as to form the output voltage $V_{out}$. That is to say, the value of the output voltage $V_{out}$ is lower than the voltage value of the grounded terminal PGND, and the output voltage $V_{out}$ is a negative voltage.

In the present embodiment, the DC transformer circuit further includes a clearer and more specific decoupling circuit 12, and the decoupling circuit 12 includes a first decoupling capacitor C1 and a second decoupling circuit C2. The first end of the first decoupling capacitor C1 is fed with the input voltage $V_{IN}$ and is connected to the input pin IN, and the second end of the first decoupling capacitor C1 is grounded. The first end of the second decoupling capacitor C2 is fed with the input voltage $V_{IN}$ and is connected to the first end of the first decoupling capacitor C1 and the input pin IN and the second end of the second decoupling capacitor C2 is connected to the ground pin GND and is conductive with the output voltage $V_{out}$. In the present invention, by connecting the decoupling capacitor 12 to the input voltage $V_{IN}$, the decoupling capacitor 12 is charged in time. For example, when a source of the input voltage $V_{IN}$ outputs an unstable input voltage $V_{IN}$, the DC transformer circuit is able to operate normally and stability based on the electric energy stored by the decoupling capacitor 12, that is, the decoupling circuit 12 has an effect of energy storage for removing signal interference.

In the present invention, the DC transformer circuit further includes an enabling circuit 13.

Figure 3:
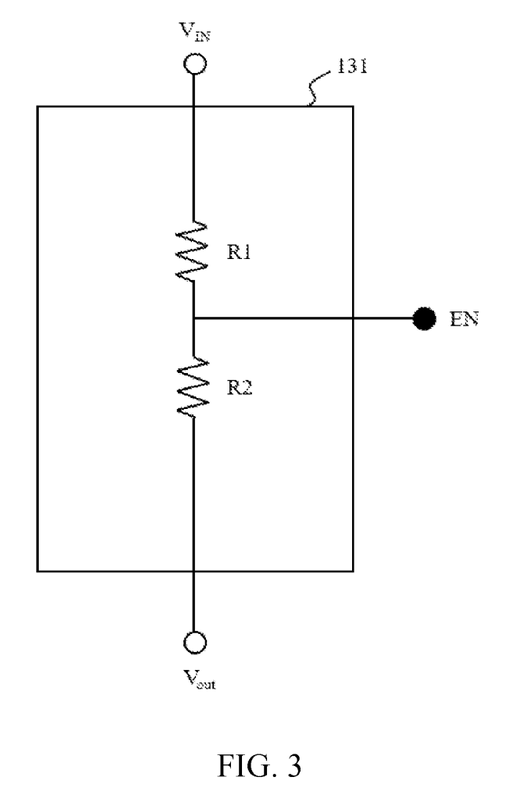
FIG. 3 is a schematic diagram showing an enabling circuit according to a first sub embodiment of the present invention.

FIG. 3 is a schematic diagram showing an enabling circuit 13 according to a first sub embodiment of the present invention.

In an embodiment, the enabling circuit 13 is a first enabling circuit 131, which includes a first voltage dividing resistor R1 and a second voltage dividing resistor R2. The first end of the first voltage dividing resistor R1 is fed with the input voltage $V_{IN}$ and is connected to the input pin IN, and the second end of the first voltage dividing resistor R1 is connected to the enabling pin EN. The first end of the second voltage dividing resistor R2 is connected to the second end of the first voltage dividing resistor R1 and the enabling pin EN, and the second end of the second voltage dividing resistor R2 is connected to the ground pin GND and is conductive with the output voltage $V_{out}$. Further, based on the value of the first voltage dividing resistor R1, the input voltage $V_{IN}$ decreases so as to form the clearer and more specific enabling voltage $V_{EN}$. As a result, the value of the first voltage dividing resistor R1 may be adjusted so as to adjust the enabling voltage $V_{EN}$. Then, the value of the second voltage dividing resistor R2 may be adjusted so as to adjust a current flowing through the enabling pin EN. In short, the first enabling circuit 15 receives the input voltage $V_{IN}$ and then outputs the enabling voltage $V_{EN}$.

Figure 4:
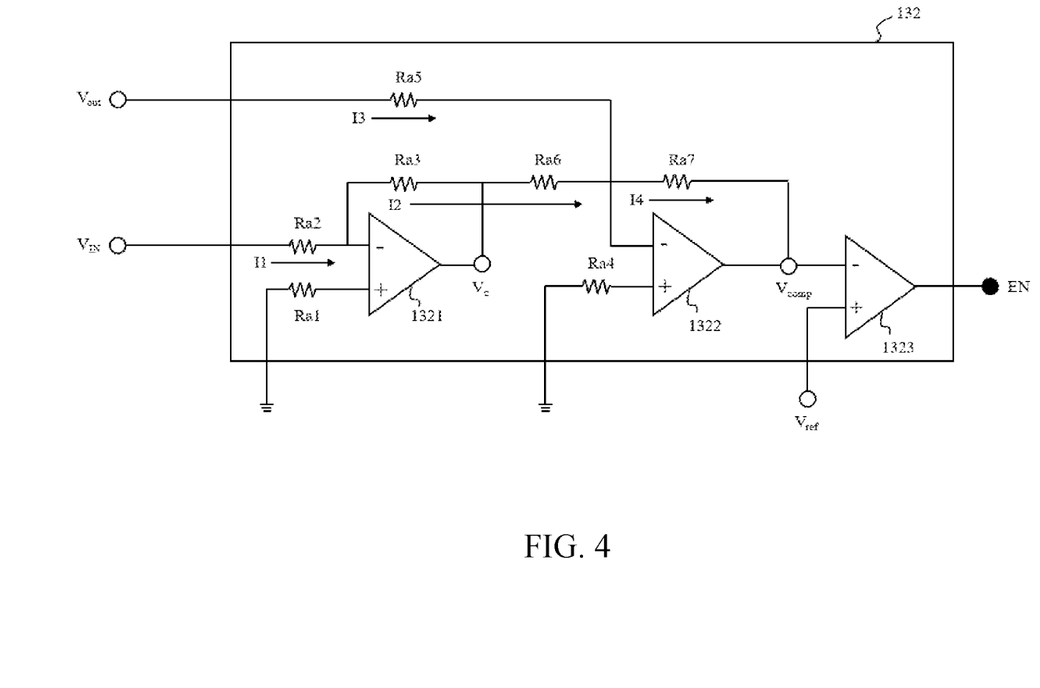
FIG. 4 is a schematic diagram showing an enabling circuit according to a second sub embodiment of the present invention.

FIG. 4 is a schematic diagram showing an enabling circuit 13 according to a second sub embodiment of the present invention.

In an embodiment, the enabling circuit 13 is a second enabling circuit 132, which includes a first operational amplifier 1321, a second operational amplifier 1322 and a comparator 1323. The positive end of the first operational amplifier 1321 is connected to one end of a first operational resistor Ra1, the other end of the first operational resistor Ra1 is grounded, the negative end of the first operational amplifier 1321 is connected to one end of a second operational resistor Ra2 and a third operational resistor Ra3, the other end of the second operational resistor Ra2 is fed with the input voltage $V_{IN}$, and the other end of the third operational resistor Ra3 is connected to the output end of the first operational amplifier 1321; meanwhile, the voltage of the output end of the first operational amplifier 1321 is a computational voltage $V_c$; the positive end of the second operational amplifier 1322 is connected to one end of a fourth operational resistor Ra4, the other end of the fourth operational resistor Ra4 is grounded, the negative end of the second operational amplifier 1322 is connected to one end of a fifth operational resistor Ra5, a sixth operational resistor Ra6 and a seventh operational resistor Ra7, the other end of the fifth operational resistor Ra5 is fed with the output voltage Vow, the other end of the sixth operational resistor Ra6 is connected to the other end of the third operational resistor Ra3 and the output end of the first operational amplifier 1321, the other end of the seventh operational resistor Ra7 is connected to the output end of the second operational amplifier 1322, and meanwhile the voltage of the output end of the second operational amplifier 1322 is a comparison voltage $V_{comp}$ and the comparison voltage $V_{comp}$ is a difference between the input voltage $V_{IN}$ and the output voltage $V_{out}$; the positive end of the comparator 1323 is fed with a reference voltage Vref and the negative end of the comparator 1323 is fed with the comparison voltage $V_{comp}$. The first operational resistor Ra1, the second operational resistor Ra2 and the third operational resistor Ra3 have a same resistance value, and the fourth operational resistor Ra4, the fifth operational resistor Ra5, the sixth operational resistor Ra6 and the seventh operational resistor Ra7 have a same resistance value.

Further, since the negative end of the first operational amplifier 1321 is connected to the output end of the first operational amplifier 1321 and the negative end of the second operational amplifier 1321 is connected to the output end of the second operational amplifier 1322, both the first operational amplifier 1321 and the second operational amplifier 1322 are connected in a negative feedback manner and both the first operational amplifier 1321 and the second operational amplifier 1322 have virtually short and virtually open properties. The present invention uses these properties to obtain the value of the comparison voltage $V_{comp}$.

Specifically, in a situation that the one end of the first operational resistor Ra1 is grounded, based on the virtually open property, no current flows through the first operational resistor Ra1 and thus the voltage value of the positive end of the first operational amplifier 1321 is 0 (grounded). Next, based on the virtually short property, the voltage (with a value of 0) of the positive end of the first operational amplifier 1321 is equal to the voltage of the negative end of the first operational amplifier 1321. Therefore, a first current I1 flowing through the second operational resistor Ra2 satisfies I1=$V_{IN}$/Ra2. Since the first operational amplifier 1321 can be taken as an extremely large resistor, the first current I1 will not flow through the negative end of the first operational amplifier 1321, and meanwhile the first current I1 is equal to a second current I2 flowing through the third operational resistor Ra3 and the computational voltage $V_c$ satisfies $V_c$=−(I2×Ra3)=−$V_{IN}$.

In a situation that the one end of the fourth operational resistor Ra4 is grounded, based on the virtually open property, no current flows through the fourth operational resistor Ra4 and thus the voltage value of the positive end of the second operational amplifier 1322 is 0 (grounded). Next, based on the virtually short property, the voltage (with a value of 0) of the positive end of the second operational amplifier 1322 is equal to the voltage of the negative end of the second operational amplifier 1322. Therefore, a third current I3 flowing through the fifth operational resistor Ra5 satisfies I3=$V_{out}$/Ra5. Since the second operational amplifier 1322 can be taken as an extremely large resistor, the third current I3 and the second current I2 flowing through the sixth operational resistor Ra6 will not flow through the negative end of the second operational amplifier 1322, and meanwhile a fourth current I4 flowing through the seventh operational resistor Ra7 is equal to a sum of the second current I2 and the third current I3, that is, (−$V_{comp}$/Ra7)= (−$V_{IN}$/Ra6)+($V_{out}$/Ra5). Therefore, the comparison voltage $V_{comp}$ satisfies $V_{comp}$=$V_{IN}$−$V_{out}$. Based on the value of the reference voltage Vref fed into the positive end of the comparator 1323 and the value of the comparison voltage $V_{comp}$ fed into the negative end of the comparator 1323, the comparator 1323 can determine whether to output the enabling voltage $V_{EN}$. The comparator 1323 outputs a high-level enabling voltage $V_{EN}$ when the comparison voltage $V_{comp}$ is greater than the reference voltage Vref and the comparator 1323 outputs a low-level enabling voltage $V_{EN}$ when the comparison voltage $V_{comp}$ is less than the reference voltage Vref. In short, the second enabling circuit 132 receives the input voltage $V_{IN}$ and the output voltage $V_{out}$ and then outputs the enabling voltage $V_{EN}$.

Base on above descriptions, in the DC transformer circuit, since the voltage difference (i.e., the comparison voltage $V_{comp}$) between the input voltage $V_{IN}$ and the output voltage $V_{out}$ is limited (not exceed 30 Volts in general cases), the present invention uses the comparator 1323 to determine whether the voltage difference is too large, thereby preventing the voltage difference from being too large to cause the DC transformer circuit malfunction or to be damaged directly.

Figure 5:
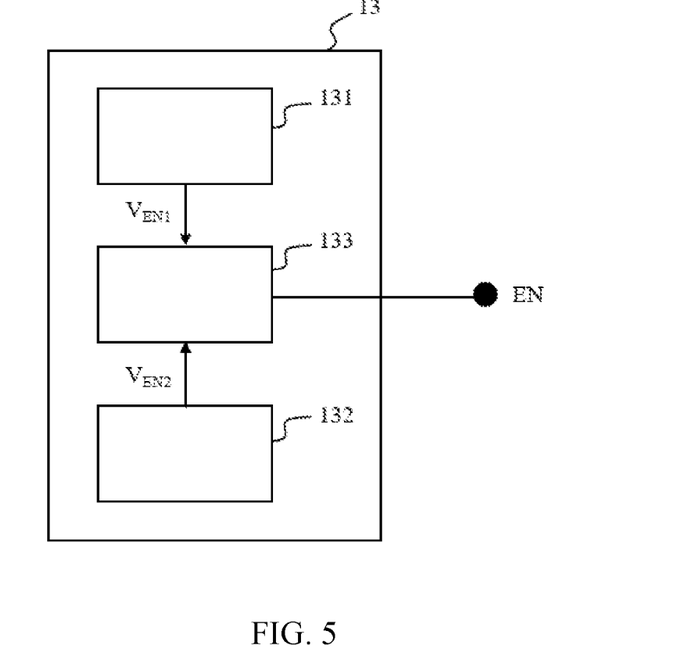
FIG. 5 is a schematic diagram showing an enabling circuit according to a third sub embodiment of the present invention.

FIG. 5 is a schematic diagram showing an enabling circuit 132 according to a third sub embodiment of the present invention.

In an embodiment, the enabling circuit 13 includes a first enabling circuit 131, a second enabling circuit 132 and a logic operational portion 133. The first enabling circuit 131 is connected to the logic operational portion 133, the second enabling circuit 132 is connected to the logic operational portion 133, and the logic operational portion 133 is connected to the enabling pin. The structures of the first enabling circuit 131 and the second enabling circuit 132 may be referred to the first sub embodiment and the second sub embodiment and are not repeated herein. The first enabling circuit 131 may be connected to the enabling pin EN via the logic operational portion 133, and the second enabling circuit 132 may be connected to the enabling circuit EN via the logic operational portion 133. The first enabling circuit 131 receives the input voltage $V_{IN}$ and outputs a first sub enabling voltage $V_{EN1}$, the second enabling circuit 132 receives the input voltage $V_{IN}$ and the output voltage $V_{out}$ and outputs a second sub enabling voltage $V_{EN2}$, the logic operational portion 133 outputs the enabling voltage $V_{EN}$ based on voltage levels of the first sub enabling voltage $V_{EN1}$ and the second sub enabling voltage $V_{EN2}$, the logic operational portion 133 performs an AND operation, the logic operational portion 133 outputs the high-level enabling voltage $V_{EN}$ when both the first sub enabling voltage $V_{EN1}$ and the second sub enabling voltage $V_{EN2}$ are at high voltage level, and the logic operational portion 133 outputs the low-level enabling voltage $V_{EN}$ when at least one of the first sub enabling voltage $V_{EN1}$ and the second sub enabling voltage $V_{EN2}$ is at low voltage level.

In an embodiment, the enabling circuit 13 is the first enabling circuit 131, and the DC transformer module 10 further includes the second enabling circuit 132 and the logic operational portion 133. Compared to the third sub embodiment, the second enabling circuit 132 of the present invention may be disposed at any suitable position. It may be referred to the descriptions of the third sub embodiment for more details, which are not repeated herein.

In the present embodiment, the module output voltage $V_{LX}$ may be a pulse voltage, and a duty ratio of the pulse voltage may be controlled by PWM. The resistor circuit 11 cooperates with the energy storing inductor L to transform the module output voltage $V_{LX}$ into the output voltage $V_{out}$. Specifically, when the module output pin LX outputs the module output voltage $V_{LX}$ and a corresponding current, in addition to being applied to the energy storing inductor L for storing electric energy, the current flows through the resistor circuit 11 and then the voltage of the grounded terminal PGND will decrease and be transformed into the output voltage $V_{out}$. When the module output pin LX does not output the module output voltage VIA, the energy storing inductor L will release the stored electric energy and a corresponding current, and the current flows through the resistor circuit 11 and then the voltage of the grounded terminal PGN will decrease and be transformed into the output voltage $V_{out}$. As can be seen, the output voltage $V_{out}$ can be generated continuously and supply for the circuit.

In the present embodiment, the DC transformer module 10 further includes a feedback pin FB, and the resistor circuit 11 includes a third voltage dividing resistor R3 and a fourth embodiment R4. The first end of the third voltage dividing resistor R3 is conductive with the second end of the energy storing inductor L and the grounded terminal PGND and the second end of the third voltage dividing resistor R3 is conductive with the feedback pin FB. The first end of the fourth voltage dividing resistor R4 is conductive with the second end of the third voltage dividing resistor R3 and the feedback pin FB and the second end of the fourth voltage dividing resistor R4 is conductive with the ground pin GND and the output voltage $V_{out}$. The resistor circuit 11 is further configured to divide the output voltage $V_{out}$ into a feedback voltage $V_{FB}$, and the feedback pin FB is used to be fed with the feedback voltage $V_{FB}$. When the feedback voltage $V_{FB}$ is too large, it indicates that the output voltage $V_{out}$ is also too large and it is easy to cause the DC transformer circuit malfunction or even be damaged directly. Since the magnitude of the output voltage $V_{out}$ is proportional to the duty ratio of the module output voltage VIA, the module output pin LX may be used to control the duty ratio (i.e., the period of the output) of the module output voltage $V_{LX}$ based on the feedback voltage $V_{FB}$ so as to prevent an excessive output voltage $V_{out}$ from being outputted.

In an embodiment, when the value of the feedback voltage $V_{FB}$ is greater than the comparison voltage of the comparator disposed in the DC transformer module 10, the comparator may output a signal able to switch off a switch (e.g., a thin-film transistor) in the DC transformer module for stopping outputting the module output voltage $V_{LX}$, thereby preventing the DC transformer circuit from malfunction or being damaged directly.

In the present embodiment, the value of the output voltage $V_{out}$ may be determined by adjusting the values of the third voltage dividing resistor R3 and the fourth voltage dividing resistor R4, which satisfy: $R4=V_{FB} \times R3(|V_{out}|-V_{FB})$. For example, the value of the feedback voltage $V_{FB}$ is 0.6 Volt, and if the output voltage $V_{out}$ of −10 Volts is to be obtained, then the value of the third voltage dividing resistor R3 may be set as 100K ohms and the value of the fourth voltage dividing resistor R4 may be set as 6.38K ohms.

In the present embodiment, the DC transformer circuit further includes a bootstrap circuit 14, and the DC transformer module 10 further includes a bootstrap pin BS. One end of the bootstrap circuit 14 is conductive with the bootstrap pin BS, and another end of the bootstrap circuit 14 is connected to the module output pin LX and the first end of the energy storing inductor 11. The bootstrap circuit 14 is configured to keep a switch (e.g., a thin-film transistor) of the DC transformer module 10 at a switched-on state, and the bootstrap circuit includes a bootstrap capacitor C3. In addition, the bootstrap circuit 14 further includes a bootstrap resistor Rb, and the bootstrap resistor Rb is connected in series with the bootstrap capacitor C3 and is configured to lower a peak voltage of the module output voltage $V_{LX}$ so as to avoid outputting an excessive module output voltage $V_{LX}$ to cause an excessive output voltage $V_{out}$.

In the present embodiment, the DC transformer circuit further includes a filter capacitor C4. The first end of the filter capacitor C4 is connected to the second end of the energy storing inductor L, the first end of the resistor circuit 11 and the grounded terminal PGND and the second end of the filter capacitor C4 is conductive with the output voltage $V_{out}$ and is connected to the second end of the resistor circuit 11 and the ground pin GND. The filter capacitor C4 is configured to store energy for removing signal interference. When the output of the module output voltage $V_{LX}$ is not stable, the DC transformer circuit may operate normally based on the energy stored in the filter capacitor C4.

In the present embodiment, the DC transformer circuit further includes a diode M. The first end of the diode M is connected to the second end of the energy storing inductor L, the first end of the resistor circuit 11 and the grounded terminal PGND and the second end of the diode M is conductive with the output voltage $V_{out}$ and is connected to the second end of the resistor circuit 11 and the ground pin GND. The diode M is configured to stabilize a voltage difference between the voltage of the grounded terminal PGND and the output voltage. Since the current of the diode M will break down when a particular forward bias voltage or backward bias voltage is applied to the diode M, a current change occurs under an extremely small change of voltage. That is, the current change is not easy to affect the change of voltage, and thus the diode M has an ability to stabilize the voltage. In order to avoid the operation of the DC transformer circuit from being affected by a reverse current generated by a load connected to the output voltage Vow, the arrangement of the diode M can realize a protection function for the DC transformer circuit. In an embodiment, the diode M may be a Zener diode.

In the present invention, the first end of the energy storage inductor L is connected with the module output pin LX, and the second end of the energy storage inductor L is connected to the grounded terminal PGND. Using the DC transformer circuit can thus generate the negative voltage for the display device. Compared to the DC buck-boost circuit adopted in the existing arts, the DC transformer circuit has an advantage of low cost. In addition, in an embodiment of the present invention, the DC transformer circuit includes an enabling circuit (i.e., the second enabling circuit 132), which determines whether to output the enabling voltage $V_{EN}$ based on the values of the input voltage $V_{IN}$ and the output voltage $V_{out}$ so as to control whether the DC transformer module works, thereby preventing the DC transformer circuit from malfunction, caused when the voltage difference between the input voltage $V_{IN}$ and the output voltage $V_{out}$ is too large.

While the preferred embodiments of the present application have been illustrated and described in detail, various modifications and alterations can be made by persons skilled in this art. The embodiment of the present application is therefore described in an illustrative but not restrictive sense. It is intended that the present application should not be limited to the particular forms as illustrated, and that all modifications and alterations which maintain the realm of the present application are within the scope as defined in the appended claims.

The invention claimed is:

1. A direct-current (DC) transformer circuit of a display device, the display device comprising a display panel, the DC transformer circuit configured to provide a voltage for driving the display panel, characterized in that the DC transformer circuit comprises:
   a DC transformer module, comprising an input pin, an enabling pin, a ground pin and a module output pin, wherein the input pin is fed with an input voltage, the enabling pin is fed with an enabling voltage, the ground pin is conductive with an output voltage, the module output pin outputs a module output voltage, and the voltage output module is configured to execute a voltage transformation function;
   an energy storing inductor, a first end of the energy storing inductor connected to the module output pin and a second end of the energy storing inductor connected to a grounded terminal, configured to be fed with the module output voltage outputted by the module output pin when the enabling pin is fed with a high-level enabling voltage; and
   a resistor circuit, the first end of the resistor circuit connected to the second end of the energy storing inductor and the second end of the resistor circuit connected to the ground pin, configured to cooperate with the energy storing inductor to transform the module output voltage into the output voltage,
   wherein a value of the output voltage is lower than a voltage value of the grounded terminal, and the output voltage is a negative voltage.

2. The DC transformer circuit of claim 1, characterized in that the DC transformer module further comprises a module output portion, the module output portion drives the outputting of the module output voltage based on the enabling voltage fed by the enabling pin, the module output portion outputs the module output voltage via the module output pin when the enabling pin is fed with the high-level enabling voltage, and the module output portion will not output the module output voltage when the enabling pin is fed with a low-level enabling voltage.

3. The DC transformer circuit of claim 1, characterized in that a voltage difference between the input voltage and the output voltage does not exceed 30 Volts.

4. The DC transformer module of claim 1, characterized in that the module output voltage is a pulse voltage, and a duty ratio of the pulse voltage is controlled by pulse-width modulation (PWM).

5. The DC transformer circuit of claim 1, characterized in further comprising a decoupling circuit for storing energy to remove signal interference, the decoupling circuit comprising:
   a first decoupling capacitor, the first end of the first decoupling capacitor fed with the input voltage and connected to the input pin and the second end of the first decoupling capacitor is grounded; and
   a second decoupling capacitor, the first end of the second decoupling capacitor fed with the input voltage and connected to the first end of the first decoupling capacitor and the input pin and the second end of the second decoupling capacitor connected to the ground pin and being conductive with the output voltage.

6. The DC transformer circuit of claim 1, characterized in further comprising a first enabling circuit, wherein the first enabling circuit receives the input voltage and outputs the enabling voltage, and the first enabling circuit comprises:
   a first voltage dividing resistor, the first end of the first voltage dividing resistor fed with the input voltage and connected to the input pin and the second end of the first voltage dividing resistor connected to the enabling pin; and
   a second voltage dividing resistor, the first end of the second voltage dividing resistor connected to the second end of the first voltage dividing resistor and the enabling pin and the second end of the second voltage dividing resistor connected to the ground pin and being conductive with the output voltage.

7. The DC transformer circuit of claim 1, characterized in further comprising a second enabling circuit, wherein the second enabling circuit receives the input voltage and the output voltage and outputs the enabling voltage, and the second enabling circuit comprises:
   a comparator, a positive end of the comparator fed with a reference voltage and a negative end of the comparator fed with a comparison voltage, configured to output the enabling voltage after comparing values of the reference voltage and the comparison voltage,
   wherein the comparison voltage is a difference between the input voltage and the output voltage.

8. The DC transformer circuit of claim 7, characterized in that the comparator outputs the high-level enabling voltage when the comparison voltage is greater than the reference voltage and the comparator outputs a low-level enabling voltage when the comparison voltage is less than the reference voltage.

9. The DC transformer circuit of claim 7, characterized in that the second enabling circuit further comprises a plurality of operational amplifiers, and the comparison voltage is obtained by calculations made by the plurality of operational amplifiers.

10. The DC transformer circuit of claim 9, characterized in that the plurality of operational amplifiers comprise:
   a first operational amplifier, in which the positive end of the first operational amplifier is connected to one end of a first operational resistor, the other end of the first operational resistor is grounded, the negative end of the first operational amplifier is connected to one end of a second operational resistor and a third operational resistor, the other end of the second operational resistor is fed with the input voltage, and the other end of the third operational resistor is connected to an output end of the first operational amplifier; and
   a second operational amplifier, in which the positive end of the second operational amplifier is connected to one end of a fourth operational resistor, the other end of the fourth operational resistor is grounded, the negative end of the second operational amplifier is connected to one end of a fifth operational resistor, a sixth operational resistor and a seventh operational resistor, the other end of the fifth operational resistor is fed with the output voltage, the other end of the sixth operational resistor is connected to the other end of the third operational resistor and the output end of the first operational amplifier, the other end of the seventh operational resistor is connected to the output end of the second operational amplifier, and the voltage of the output end of the second operational amplifier is the comparison voltage,
   wherein the first operational resistor, the second operational resistor and the third operational resistor have a same resistance value, and the fourth operational resistor, the fifth operational resistor, the sixth operational resistor and the seventh operational resistor have a same resistance value.

11. The DC transformer circuit of claim 10, characterized in that a first current flowing through the second operational resistor satisfies $I1=V_{IN}/Ra2$, the first current I1 is equal to a second current flowing through the third operational resistor, and a computational voltage of the output end of the first operational amplifier satisfies $V_c=-(I2\times Ra3)=-V_{IN}$, wherein I1 is the first current, I2 is the second current, $V_c$ is the computational voltage, $V_{IN}$ is the input voltage, Ra2 is the second operational resistor, and Ra3 is the third operational resistor.

12. The DC transformer circuit of claim 11, characterized in that a third current flowing through the fifth operational resistor satisfies $I3=V_{out}/Ra5$, a fourth current flowing through the seventh operational resistor is equal to a sum of the second current and the third current, and meanwhile the comparison voltage satisfies $V_{comp}=V_{IN}-V_{out}$, wherein I3 is the third current, $V_{out}$ is the output voltage, Ra5 is the fifth operational resistor, and $V_{comp}$ is the comparison voltage.

13. The DC transformer circuit of claim 1, characterized in further comprising a first enabling circuit, a second enabling circuit and a logic operational portion, wherein the first enabling circuit is connected to the logic operational portion, the second enabling circuit is connected to the logic operational portion, the logic operational portion is connected to the enabling pin, the first enabling circuit receives the input voltage and outputs a first sub enabling voltage, the second enabling circuit receives the input voltage and the output voltage and outputs a second sub enabling voltage, the logic operational portion outputs the enabling voltage based on voltage levels of the first sub enabling voltage and the second sub enabling voltage, the logic operational portion outputs the high-level enabling voltage when both the first sub enabling voltage and the second sub enabling voltage are at high voltage level, and the logic operational portion outputs a low-level enabling voltage when at least one of the first sub enabling voltage and the second sub enabling voltage is at low voltage level.

14. The DC transformer circuit of claim 1, characterized in that the DC transformer module further includes a feedback pin, the resistor circuit is further configured to divide the output voltage into a feedback voltage, the feedback pin is used to be fed with the feedback voltage, the module output pin is used to control a period of the output of the module output voltage based on the feedback voltage, and the resistor circuit comprises:
   a third voltage dividing resistor, the first end of the third voltage dividing resistor being conductive with the second end of the energy storing inductor and the grounded terminal and the second end of the third voltage dividing resistor being conductive with the feedback pin; and
   a fourth voltage dividing resistor, the first end of the fourth voltage dividing resistor being conductive with the second end of the third voltage dividing resistor and the feedback pin and the second end of the fourth voltage dividing resistor being conductive with the ground pin and the output voltage.

15. The DC transformer circuit of claim 14, characterized in that the fourth voltage dividing resistor satisfies $R4=V_{FB}\times R3(|V_{out}|-V_{FB})$, wherein R3 is the third voltage dividing resistor, R4 is the fourth voltage dividing resistor, $V_{FB}$ is the feedback voltage, and $V_{out}$ is the output voltage.

16. The DC transformer circuit of claim 1, characterized in further comprising a bootstrap circuit, wherein the DC transformer module further comprises a bootstrap pin, one end of the bootstrap circuit is conductive with the bootstrap pin, another end of the bootstrap circuit is connected to the module output pin and the first end of the energy storing inductor, the bootstrap circuit is configured to keep a switch of the DC transformer module at a switched-on state, and the bootstrap circuit comprises a bootstrap capacitor.

17. The DC transformer circuit of claim 16, characterized in that the bootstrap circuit further comprises a bootstrap resistor, and the bootstrap resistor is connected in series with the bootstrap capacitor and is configured to lower a peak voltage of the module output voltage.

18. The DC transformer circuit of claim 1, characterized in further comprising:
   a filter capacitor, the first end of the filter capacitor connected to the second end of the energy storing inductor, the first end of the resistor circuit and the grounded terminal and the second end of the filter capacitor being conductive with the output voltage and connected to the second end of the resistor circuit and the ground pin, configured to store energy for removing signal interference.

19. The DC transformer circuit of claim 1, characterized in further comprising:
   a diode, the first end of the diode connected to the second end of the energy storing inductor, the first end of the resistor circuit and the grounded terminal and the second end of the diode being conductive with the output voltage and connected to the second end of the resistor circuit and the ground pin, configured to stabilize a voltage difference between the voltage of the grounded terminal and the output voltage.

20. The DC transformer circuit of claim 19, characterized in that the diode is a Zener diode.

* * * * *